(12) United States Patent
Basso et al.

(10) Patent No.: US 12,246,985 B2
(45) Date of Patent: Mar. 11, 2025

(54) SCRATCH-RESISTANT COATING FOR GLASS CERAMIC COOKTOP

(71) Applicant: Whirlpool EMEA S.p.A., Parma (IT)

(72) Inventors: Margherita Basso, Scorzè (IT); Luigi De Nardo, Milan (IT); Agnese D'Agostino, Gioia Sannitica (IT)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 104 days.

(21) Appl. No.: 17/519,899

(22) Filed: Nov. 5, 2021

(65) Prior Publication Data

US 2022/0144696 A1 May 12, 2022

(30) Foreign Application Priority Data

Nov. 6, 2020 (IT) .................. 102020000026557

(51) Int. Cl.
C03C 17/00 (2006.01)
C03C 10/00 (2006.01)
C03C 17/22 (2006.01)
C04B 35/58 (2006.01)
C04B 35/581 (2006.01)
C04B 35/622 (2006.01)
C04B 35/624 (2006.01)
C04B 35/626 (2006.01)
(Continued)

(52) U.S. Cl.
CPC ............ *C03C 17/225* (2013.01); *C03C 10/00* (2013.01); *C04B 35/58035* (2013.01); *C04B 35/581* (2013.01); *C04B 35/62222* (2013.01); *C04B 35/624* (2013.01); *C04B 35/6264* (2013.01); *C04B 35/632* (2013.01); *C04B 35/64* (2013.01); *C03C 2217/281* (2013.01); *C03C 2217/29* (2013.01); *C03C 2217/78* (2013.01); *C03C 2218/113* (2013.01)

(58) Field of Classification Search
None
See application file for complete search history.

(56) References Cited

U.S. PATENT DOCUMENTS 6,360,423 B1   3/2002   Groll
6,372,290 B1   4/2002   Berkenkoetter et al.
(Continued)

FOREIGN PATENT DOCUMENTS

EP   2116774 A1   11/2009
FR   2846920 B1   1/2005
(Continued)

OTHER PUBLICATIONS

WO-2018069660-A1, English translation (Year: 2018).*
(Continued)

*Primary Examiner* — Stefanie J Cohen
(74) *Attorney, Agent, or Firm* — Brooks Kushman P.C.

(57) ABSTRACT

Scratch-resistant coatings, especially for cooktops, and substrates or products having said scratch-resistant coatings and methods for the production thereof are described herein. More particularly, scratch-resistant coatings obtained via sol-gel approach and coated substrates having thereon a hard material layer comprising metal nitride(s) and/or metal oxynitride complexes are described, as well as the manufacturing thereof.

5 Claims, 3 Drawing Sheets

(51) Int. Cl.
  *C04B 35/632* (2006.01)
  *C04B 35/64* (2006.01)

(56) References Cited

U.S. PATENT DOCUMENTS

| | | | |
|---|---|---|---|
| 6,841,093 B2 * | 1/2005 | Kim | C09K 11/7734 |
| | | | 252/301.4 R |
| 6,942,920 B2 | 9/2005 | Carre et al. | |
| 7,381,469 B2 | 6/2008 | Moelle et al. | |
| 7,541,102 B2 | 6/2009 | Klippe et al. | |
| 7,964,294 B2 | 6/2011 | Venkataramani et al. | |
| 8,409,716 B2 | 4/2013 | Schultz et al. | |
| 8,460,804 B2 | 6/2013 | Henn et al. | |
| 9,006,620 B2 | 4/2015 | Vilato et al. | |
| 9,109,122 B2 | 8/2015 | Tuffe et al. | |
| 9,574,262 B2 | 2/2017 | Henn et al. | |
| 10,405,379 B2 | 9/2019 | Lestringant et al. | |
| 2004/0258611 A1 | 12/2004 | Barrow et al. | |
| 2010/0101429 A1 | 4/2010 | Shigeru et al. | |
| 2011/0021335 A1 * | 1/2011 | Buskens | C03C 1/008 |
| | | | 106/286.6 |
| 2014/0147661 A1 * | 5/2014 | Yasuda | B01J 13/0047 |
| | | | 428/329 |
| 2014/0302231 A1 * | 10/2014 | Boy | C04B 41/009 |
| | | | 427/126.3 |
| 2014/0311358 A1 | 10/2014 | Pigeat et al. | |
| 2015/0355382 A1 | 12/2015 | Henn et al. | |
| 2015/0376056 A1 | 12/2015 | Damm et al. | |
| 2016/0083863 A1 * | 3/2016 | Cook | C23C 18/1254 |
| | | | 423/625 |
| 2017/0020331 A1 | 1/2017 | Berrux et al. | |
| 2017/0096365 A1 | 4/2017 | Henn et al. | |
| 2020/0095465 A1 * | 3/2020 | Suleiman | C09D 5/08 |
| 2020/0216669 A1 * | 7/2020 | Sperindio | C09D 201/10 |

FOREIGN PATENT DOCUMENTS

| | | | |
|---|---|---|---|
| WO | 94/13853 A1 | 6/1994 | |
| WO | 00/65876 A1 | 11/2000 | |
| WO | 2005/010225 A1 | 2/2005 | |
| WO | WO-2018069660 A1 * | 4/2018 | ........... C09D 11/101 |

OTHER PUBLICATIONS

Gonzalez et al., Microstructural Analysis of TiAlxNyOz Coatings Fabricated by DC Reactive Sputtering, Journal of Materials Engineering and Performance, 18(1), 102-105 (Year: 2009).*
Chinese Office Action for CN Application No. 202111301413 dated Aug. 10, 2023 and English Translation, 19 pages.
Sorochkina, et al., "Zirconium and aluminum oxyhydroxides particles formation during sol-gel processes", Colloids and Surfaces A: Physiochemical and Engineering Aspects; Elsevier, Amsterdam, NL, vol. 484; pp. 56-61, Jul. 26, 2015.
Alaei et al., "Preparation of High Surface Area ZrO2 Nanoparticles", Iran J. Chem Chem Eng., pp. 47-53, Jan. 1, 2014.
Chavez-Esquivel, G. et al., "The Influence of Al2O3 content on Al2O3—ZrO2 composite-textural structural and morphological studies", Materials Research Express, vol. 6, No. 10 p. 105201, Aug. 7, 2019.
Genet Clement et al., "Innovative Formulation Combining Al, Zr, and Si Precursors to Obtain Anticorrosion Hybrid Sol-Gel Coating", Molecules, vol. 23, No. 5, p. 1135, May 1, 2018.
Cristina Giordano et al., "Metal Nitride and Metal Carbide Nanoparticles by a Soft Urea Pathway", Chemistry of materials, vol. 21, No. 21, pp. 5136-5144, Nov. 10, 2009.
European Search Report for EP 21206779.7 dated Mar. 30, 2022, 13 pages.

* cited by examiner

SCRATCH-RESISTANT COATING FOR GLASS CERAMIC COOKTOP

CROSS-REFERENCE TO RELATED APPLICATION

This application claims priority to Italian Patent Application No. 102020000026557 filed Nov. 6, 2020, the disclosure of which is hereby incorporated in its entirety by reference herein.

TECHNICAL FIELD

The present application is directed to scratch-resistant coatings, especially for cooktops, to substrates or products having said scratch-resistant coatings and to methods for the production thereof. More particularly the present application relates to scratch-resistant coatings in the form of sol and coated substrates having thereon a hard material layer comprising metal nitride(s) and to the manufacturing thereof.

BACKGROUND

Substrates for cooktops, particularly glass ceramic cooktops, are often exposed to the risk of scratching, for example, when moving pots and pans on their surface, especially when not perfectly cleaned, and also during cleaning operations. Also, sponges commonly available on the market can be highly abrasive and detergents can enhance this action. Of course, scratches lead to an unpleasant appearance, have an adverse effect on cleaning and, in severe cases, also on heating.

Various scratch-resistant coatings for substrates intended for cooktops are known in the art. For example, U.S. Pat. No. 9,574,262 and patent application US2017/0096365 generally disclose a scratch-resistant transparent coating having a hard material layer based on crystalline aluminum nitride, and the manufacturing thereof by magnetron sputtering or high-power impulse magnetron sputtering. Patent application US2015/0355382 discloses a coating in form of a dual material system further comprising an anti-reflecting coating (low refractive index layer) comprising $SiO_2$ and the manufacturing thereof by sputtering. As confirmed in these patents/patent applications the properties of the hard material layer are achieved if the coating is applied by sputtering. However, sputtering is a very expensive process, both in terms of time and costs. Other disadvantages may be given by low reproducibility level of results, with major impact of batch to batch production variation, which will be strongly impacting high volumes/mass production. Moreover, it has been observed that these types of coatings have a dichroic-like optical effect, changing the initial appearance of the substrate onto which they are deposited, and therefore making them not suitable to be applied onto transparent glass ceramic. Also, they are not suitable to easily obtain patterns, graphics or any other decorative design. Moreover, sputtering and vacuum processes have no possibility to exploit the use of fillers in the basic coating composition, since they deposit material from a target, with no possibility to integrate any functional or aesthetical fillers.

European Patent EP2116774 discloses a cooking device provided with a base material and a thin film formed on a surface of this base material comprising silicon, zirconium and oxygen such that, when the silicon and zirconium are respectively converted to silicon dioxide ($SiO_2$) and zirconium oxide ($ZrO_2$), the weight percent of $SiO_2$ relative to the total amount of $SiO_2$ and $ZrO_2$ is in a range of 1 to 20% w. Even if this type of coating has been shown to enhance cleanability properties compared to uncoated glass ceramic and/or other types of coatings for cooktops, it has the drawback to poorly improve scratch resistance.

U.S. Pat. No. 8,460,804 discloses a thick silicon oxynitride coating as a scratch-resistant layer on glass or glass-ceramic substrates, wherein the ratio of atomic percentages of oxygen to nitrogen in the silicon oxynitride layer amounts to more than 1, preferably at least 2. The oxygen component in the layer causes a reduction in the refractive index and reduces reflections when compared with a pure silicon nitride layer. However, this is also accompanied by a severe reduction in hardness, since the silicon oxynitride layer approximates a silicon oxide layer with increasing oxygen content, which is no longer greatly distinguished from typical glass substrates or glass-ceramic substrates with respect to its hardness.

Therefore, there is still the need for scratch-resistant surface treatments or coatings having the desired physical-chemical properties, in particular the desired hardness and cleanability, which exhibit high resistance to wearing and polishing stress, which occurs during manufacturing and also during subsequent use, which are transparent in the visible range wavelength and generally able to overcome the drawbacks of those already known in the art.

Moreover, there is still the need for more effective and affordable methods for the deposition of these scratch-resistant coatings onto substrates or products such as, for example, cooking items and appliances, compared to those generally used in the art such as sputtering, PVD, or vacuum processes in general.

SUMMARY

An object of the present invention is to develop a scratch-resistant transparent coating for cooking substrates, items and/or appliances as well as methods for the preparation thereof. In particular, the invention relates to scratch-resistant coatings and coated substrates, items and/or appliances having thereon a hard scratch-resistant layer comprising metal nitride(s), for example aluminum nitride and zirconium nitride, and/or metal oxynitride complexes, for example aluminum-zirconium oxynitride, and to the preparation thereof.

Therefore, an object of the invention is a method for preparing a sol for use as a coating comprising or consisting of the following steps:

i) solubilizing one or more metal precursors, preferably selected among metal chlorides, metal alkoxides or mixtures thereof, in a suitable solvent;

ii) mixing the solubilized metal precursor(s) with a nitrogen carrier, characterized in that the molar ratio between the nitrogen carrier and the metal precursor(s) is preferably between 0.5 to 5, and a sol obtainable by this method.

The invention also refers to a sol for use as a coating based on metal nitride(s) and/or metal oxynitride complexes, particularly comprising, or consisting of, aluminum nitride and zirconium nitride and/or aluminum-zirconium oxynitride.

Another object of the invention is a method for preparing a coated substrate comprising, or consisting of, the following steps:

preparing a sol according to the above-disclosed method;
coating the sol onto a substrate,
and a coated substrate obtainable according to this method.

The invention also refers to a coated substrate having an outer and/or an inner surface, wherein part or whole of said outer and/or inner surface is coated with the sol as defined above, preferably wherein the substrate is glass ceramic or lithium-alumina-silicon (LAS) glass ceramic.

As will be apparent from the detailed description below, the sol and/or the substrate coated with the sol of the present invention can be used in a variety of fields and applications. For instance, the invention refers to cookware or cooktop item(s) intended for cooking food, wherein the cookware or cooktop item(s) comprise(s) a cooking surface in turn comprising the sol and/or the coated substrate as defined above as well as to household appliances intended for cooking food, comprising a cooking surface and electrically- or gas-operated means for heating said cooking surface, wherein said cooking surface comprises the sol and/or the coating substrate as defined above.

Within the cooking field, the sol for use as a scratch-resistant coating and the coated substrates of the invention will find application in the field of radiation heating as well as in the fields of induction and gas heating.

The sol for use as a coating and the coated substrates of the invention are mainly, but not only, intended for cooking surfaces or temperature-stressed glass plates and provide an effective protective coating on cooking surfaces, so as to visibly reduce mechanical or chemical attacks produced by cooking items such as pots or by common household foods and cleaners during the service life of a cooking surface, guaranteeing a crack-free, transparent and uniform appearance. Other advantages of the invention will be apparent from the detailed description below.

DETAILED DESCRIPTION

Figure 1:
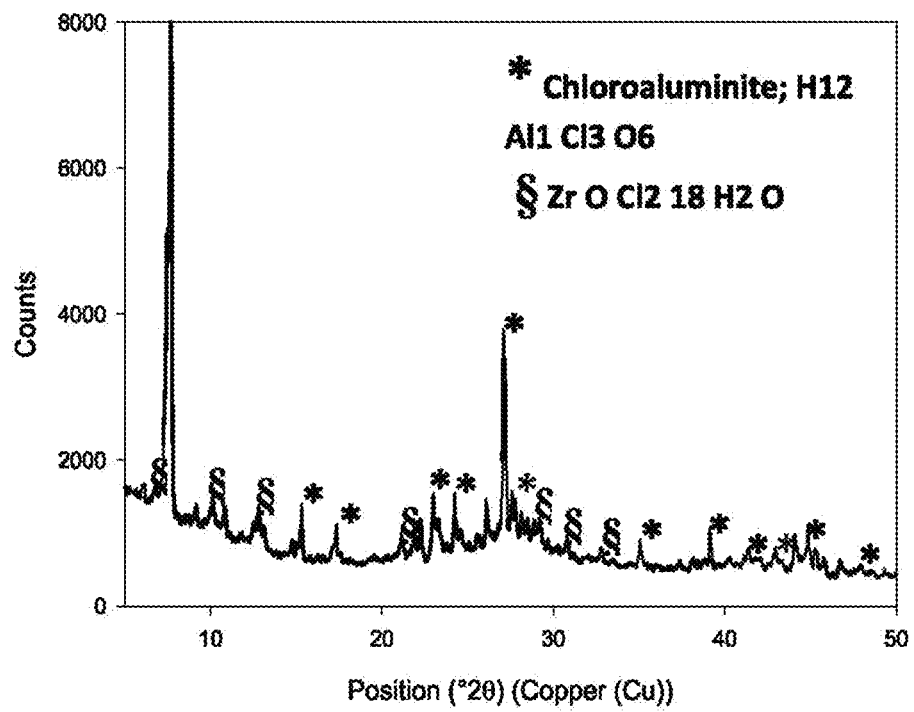
FIG. 1 is a graph showing the X-ray powder diffraction (XRPD) spectrum of dried sol with R=1.

As required, detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the context of the present invention, the term "sol" has the meaning as commonly understood in the art. In particular, the term sol indicates a colloid, i.e. an aggregate of very fine solid particles dispersed in a continuous fluid medium.

In the present description, the terms "sol" and "sol for use as a coating" or "sol for coating" are also used with reference to the coating after deposition and/or curing and/or drying onto a substrate or product, which technically may be better defined as "film". Therefore, in the context of the present description, the terms "sol for use as a coating", "sol for coating", "coating in form of sol", "coating" and "film" are interchangeable.

Several deposition techniques such as, for example, Physical Vapor Deposition (PVD), Chemical Vapor Deposition (CVD) and sputter deposition have been traditionally used in the art in order to coat surfaces of different materials.

Beside the drawback already outlined above, one of the main disadvantages of such types of processes is the low compatibility with continuous productions processes, such as the one used to produce and "ceramize" glass ceramic panels. The traditional glass ceramic production process exploits tunnel ovens able to reach very high temperatures, which would be stopped if any one among the above-mentioned vacuum coatings processes will be needed, given their batch production. Moreover, these techniques are not usually able to give short deposition times for significantly thick coatings, like the ones in the range 1-4 micrometers.

As already anticipated above, synthesis of the sol for use as a coating of the present invention is based on sol-gel process, a wet chemical technique also known as chemical solution deposition, considered effective to modify the surface of substrates in a simple and reproducible way.

The inventors surprisingly found that by using the sol-gel process a stable, transparent and scratch-resistant coating based on metal nitrides can be obtained.

Therefore, the present invention refers to a method for preparing a sol for use as a coating comprising, or consisting of, the following steps:

i) solubilizing one or more metal precursors in a suitable solvent; and ii) mixing the solubilized metal precursor(s) with a nitrogen carrier.

After extensive experimentation, the inventors, without wishing to be bound to any particular theory, came to the conclusion that obtained sols are clear when the molar ratio between the number of moles of nitrogen carrier and the number of moles of metal precursor(s), hereinafter also indicated as R, is between 0.5 and 2, extremes included, whereas they are slightly opalescent when R values are higher than 2. Clear sols have the further advantage that they can be stored at room temperature for more than six months, with full stability of the solution and can be used for coating without any further treatment.

If R is higher than 2, the coating is stable but only for the first 24 hours, after that the precipitation of aggregates starts and changes the product with no possibility to solubilize them anymore whereas, if R is higher than 5, aggregates formation starts right after mixing, with no possibility to solubilize them or process the coating in any case. If R is lower than 0.5, the yield in the conversion reaction to nitrides in the final product is too low, with small formation of nitrides and too low improvement in scratch resistance.

Therefore, an object of the present invention is a method for preparing a sol for use as a coating comprising the following steps:

i) solubilizing one or more metal precursors in a solvent;

ii) mixing the solubilized metal precursor(s) with a nitrogen carrier, characterized in that the molar ratio between the nitrogen carrier and the metal precursor(s) is between 0.5 to 5, preferably between 0.5 to 2, more preferably about 1.

Metal precursors that can be used in the present invention are preferably selected among metal salts, metal alkoxides or mixtures thereof.

Any metal salts known in the art to be a useful precursor for the synthesis of metal nitrides can in principle be selected. According to the present invention, metal salts can preferably be selected among metal chlorides such as, for example, aluminum chloride ($AlCl_3$), zirconium chloride ($ZrCl_4$), titanium chloride, lithium chloride, magnesium chloride, sodium chloride, potassium chloride, vanadium chloride, silicon chloride, molybdenum (V) chloride, tungsten (IV) chloride and mixture thereof. More preferably, said metal chlorides comprise aluminum chloride and/or zirconium chloride.

Any metal alkoxide known in the art to be a useful precursor for the synthesis of metal nitrides can in principle be selected. According to the present invention, metal alkoxide can preferably be selected among aluminum sec-butoxide ($C_{12}H_{27}AlO_3$), aluminum ethoxide, aluminum isopropoxide, barium isopropoxide, calcium methoxide, silicon tetraethoxide, titanium ethoxide and mixture thereof. More preferably, said metal alkoxide comprise, or consist of, aluminum sec-butoxide.

According to one embodiment of the present invention, the metal precursors can comprise, or consist of, aluminum chloride, zirconium chloride, aluminum sec-butoxide or mixtures thereof such as, for example, a mixture of aluminum chloride and zirconium chloride or a mixture of aluminum chloride, zirconium chloride, and aluminum sec-butoxide. According to a preferred embodiment of the present invention, the metal precursors comprise, or consist of, a mixture of aluminum chloride and zirconium chloride.

According to the present invention, the nitrogen carrier is a N-containing organic molecule which can be preferably selected among urea ($CO(NH_2)_2$), guanidine ($HNC(NH_2)_2$), cyanamide ($CN_2H_2$), 4,5-dicyanoimidazole ($C_5H_2N_4$) or a mixture thereof and more preferably is urea.

The solvent can be selected, for example, among alcohols such as e.g. ethanol, propanol, isopropanol, water or mixtures thereof and is preferably ethanol.

Even if the method parameters are not essential features of the present invention and can be easily adjusted, e.g. depending on the batch volume, for a batch volume between 50 mL and 250 mL said solubilizing step (i) is preferably carried out under continuous stirring, for example at 500-800 rpm, preferably 750 rpm, till complete dissolution of the metal precursor(s) in the solvent, for example for twenty minutes, preferably thirty minutes, at a temperature of 22° C. to 26° C., preferably 25° C. (room temperature).

The overall concentration of said metal precursor(s) in the solvent is comprised between 0.05 and 0.5 M and is preferably 0.1 M. This concentration range is preferred since it has been shown that concentration of metal precursor(s) minor than 0.05 is too low to enable the formation of final products while concentration higher than 0.5 leads to the formation of precipitates in the mixture.

After complete dissolution of the metal precursor(s), the appropriate amount of nitrogen carrier, for example urea and/or guanidine, is added to the solution in order to obtain an R value of at least 0.5 to 5, preferably 0.5 to 2, more preferably 1, and mixed with the solution. Said mixing step (ii) can be carried out under continuous stirring preferably at 500-800 rpm, more preferably 750 rpm till complete dissolution, for example, for at least twenty minutes, preferably thirty minutes, at room temperature.

After completely dissolution of the nitrogen carrier(s), GLYMO ((3-Glycidyloxypropyl)trimethoxysilane), preferably a solution of GLYMO ((3-Glycidyloxypropyl)trimethoxysilane) 0.05 M in ethanol, can be optionally added to the sol. Even if this is not an essential step to obtain the sol, it has been noted that the addition of GLYMO promotes the adhesion of the sol to substrates and enhance the viscosity of the sol.

Therefore, the invention also relates to a method for preparing a sol for use as a coating comprising, or consisting of, the following steps:
i) solubilizing one or more metal precursors in a solvent;
ii) mixing the solubilized metal precursor(s) with a nitrogen carrier;
iii) optionally adding (3-glycidyloxypropyl)trimethoxysilane;
characterized in that the molar ratio between the nitrogen carrier and the metal precursor(s) is between 0.5 to 5, preferably between 0.5 to 2, more preferably about 1.

Then, the sol is taken under continuous nitrogen flux, for example for 10 to 20 hours at room temperature. It is to be noted that without taking the sol under nitrogen flux, there is the chance that part of the metal precursors converts to others oxidation by-products in place of the desired metal nitrides.

Therefore, according to a preferred embodiment, the method for preparing a sol for use as a coating comprises, or consists of, the following steps:
i) solubilizing one or more metal precursors in a solvent;
ii) mixing said solubilized metal precursors with a nitrogen carrier;
iii) optionally adding (3-glycidyloxypropyl)trimethoxysilane;
iv) taking the so obtained sol under nitrogen flux, characterized in that the molar ratio between the nitrogen carrier and the metal precursor(s) is between 0.5 to 5, preferably between 0.5 to 2, more preferably about 1.

The present invention also refers to a sol obtainable by the method according to any one of the method embodiments herein disclosed.

Another object of the present invention is a sol for use as a coating comprising metal nitrides such as, for examples, aluminum nitride and zirconium nitride and/or metal oxynitride complexes such as, for example aluminum-zirconium oxynitride.

The sol for use as a coating according to the present invention can be characterized by methods usually employed in the art for the characterization of coatings such as, for example, X-ray diffraction. To this end, a dry powder was obtained by evaporation of 2 mL of sol with R=1 in a petri dish and used to carry out the analysis. According to an embodiment, the sol dry powder has an X-ray powder diffraction (XRPD) spectrum comprising the following peaks: 13°, 26° and 27° (°2 θ±0.1° using Cu-Kα1 radiation), and preferably has an XRPD spectrum as depicted in FIG. 1.

The presence of a main sharp characteristic peak at 26°, corresponds to aluminum compounds such as chloraluminite and secondary smaller peaks at 13° and 27° correspond to zirconium compounds.

Liquid sols with R=1 show a viscosity of 500 Pa s$^{-1}$ to 5.000 Pa s$^{-1}$, preferably of 1.350 Pa·s, as measured by capillary viscometer or Ostwald viscometer, a device used to measure the viscosity of the liquid with a known density. The method of determining viscosity with this instrument consists of measuring the time for a known volume (1.5 mL) of the liquid to flow through the capillary under the influence of gravity. Firstly, the instrument must be calibrated with materials of known viscosity (ethanol in our case). Measures are repeated five times at room temperature of 24° C.

When an enhancement in viscosity is desired, viscosity control additives and/or excipients can be added into the sol. Suitable viscosity control additives (or viscosity modifiers or thickeners) can be selected among the group comprising, for example, surfactants, methylcellulose or mixtures thereof.

Preferably, polyvinyl alcohol (PVA) and/or methylcellulose is used. Viscosity control additives are directly added to the sol obtained according to any of the method embodiments herein disclosed up to get a final concentration of 0.5% wt.

The addition of one or more of these viscosity control additives enables enhancement of viscosity up 1.5-3 Pa·s. The possibility to enhance the viscosity of the sol represents a further advantage of the present invention. Viscosity should in fact be fine-tuned due to the need of using different coating processes: for example, for silk screen printing too low viscosities (<1.0 Pa·s) are not ensuring a good coating uniformity and containment, while with too high viscosities (>4 Pa·s) defects appear on the coating surface, leading to a non-uniform result and non-uniform thickness all over the substrate.

Therefore, the present invention also refers to a method for preparing a sol for use as a coating, according to any one of the embodiments herein disclosed, comprising a further step of adding a viscosity modifier or thickener, preferably selected among polyvinyl alcohol (PVA), methylcellulose or mixtures thereof.

In other words, according to an embodiment, the method for preparing a sol for use as a coating comprises, or consists of, the following steps:
  i) solubilizing one or more metal precursors in a solvent;
  ii) mixing the solubilized metal precursor(s) with a nitrogen carrier;
  iii) optionally adding (3-glycidyloxypropyl)trimethoxysilane;
  iv) optionally taking the so obtained sol under nitrogen flux,
  v) adding a viscosity modifier or thickener, preferably selected among polyvinyl alcohol (PVA), methylcellulose or mixtures thereof,
  characterized in that the molar ratio between the nitrogen carrier and the metal precursor(s) is between 0.5 to 5, preferably between 0.5 to 2, more preferably about 1.

The sol according to any one of the embodiments herein disclosed, especially those having an R value between 0.5 and 2, are really stable and show a pot life of at least 6 months at room temperature.

Another object of the present invention is a method for preparing a coated substrate comprising the following steps:
  a) preparing a sol according to anyone of the embodiments of the method herein disclosed;
  b) coating the sol on a substrate.

Said coating can be carried out according to any of the methods and procedures known in the art for the deposition of thin films onto a substrate. Preferably, said coating is carried out by dip-coating, spray-coating, digital printing, roll coating and/or screen-printing method.

In said dip-coating the substrate is immersed in whole or in part, usually one time, in the sol by a dipper, preferably using a speed of immersion of 50 mm/min to 300 mm/min, more preferably 100 mm/min.

In said spray-coating the whole or part of the substrate is spayed by a spray gun with a spray rate of 0.1 ml/min to 5 ml/min, preferably of 1 ml/min.

By using the dip-coating or spray-coating method, the deposited coating generally has a thickness of 100-200 nm.

In said digital printing, the substrate is placed horizontally and the sol is sprayed onto the surface through nozzles up to a predetermined quantity, preferably in areas defined through a dedicated design, able to make patterns with high resolution, without the need of any mesh.

In said roll coating, the substrate is placed horizontally and, by using a roll impregnated with the sol, sol is applied onto the surface of the substrate by moving the substrate onto a conveyor belt.

In said screen-printing, the substrate is placed horizontally and, upon loading the sol onto the screen, a squeegee is swept across whole or part of the surface of the substrate. By using the screen-printing method, generally the deposited coating has a thickness of 1-8 μm, preferably of 4 μm.

As will be apparent to a person skilled in the art, according to the present invention, no hard coatings techniques are needed for the deposition of the sol onto the substrate, such as sputtering, PVD, or vacuum processes in general. This represents a further advantage of the invention.

The method according to any one of the embodiments herein disclosed, can further comprise a curing step.

Therefore, the present invention also refers to a method for preparing a coated substrate comprising the following steps:
  a) preparing a sol according to any of the embodiments of the method herein disclosed;
  b) coating the sol on a substrate;
  c) optionally curing the sol onto the substrate.

The curing step is generally carried out at a temperature between 700 and 900° C., preferably at 780-850° C. for a suitable period of time, such as 10 minutes to 3 hours, preferably for 1 to 2 hours.

This curing step is carried out using any type of oven able to reach temperatures up to 900° C. Tunnel or batch ovens can be used in the same way, with a normal air atmosphere. The duration of the treatment may vary among 10 minutes and 3 hours, more preferably between 1 and 2 hours. The heating ramp that may be between 5° C./min to 50° C./min, more preferably 10-20° C./min, more preferably 10 to 15° C./min.

Even if it does not represent an essential feature for the curing step c), the heating ramp slope can influence the final aesthetic of the coating, together with the deposited layer thickness. Slow speed ramps (<15° C./min) reduces the evaporation rate of solvents, increasing homogeneity of the coating and reducing the risk of having surface cracking. With such a heating ramp, the coating will be transparent in the visible range, with no aesthetic variation compared to uncoated substrate allowing also light transmission, for example, for areas of cooktops where LED light is present, like in control panel (UI) and display area. Medium range ramps (from 15 to 50° C./min) allow to obtain a different aesthetic, with lower gloss appearance, higher surface roughness and a slightly higher risk of having surface cracks during the process due to potential temperature fluctuation in the oven cavity. As last, quicker ramps (>50° C./min) can have a negative effect on coating, resulting in surface cracking, partial detachment from the surface and non-uniform appearance. Such a product should not be used, given a discontinuous presence of the coating on the surface.

In general, coating will be less sensitive to heating ramps if it has been already pre-cured as described more in detail below, even if the ramp speed should not exceed 150° C./min, where high cracking risk anyway exists. The best option is then to choose a slow or medium heating ramp rate, in order to find the compromise among aesthetic and coating uniformity, most preferably with ramps between 10 and 40° C./min.

As heating ramps, also the initial quantity and thickness of deposited coating will influence the final aesthetic of the product. Low thickness layers, deposited for example using spray coating, are less sensitive to heating ramp speed, allowing to obtain a good result, with full transparency on the visible range and no change in aesthetic or slightly metallic reflection. The reduced thickness allows uniform solvent evaporation, even if a too low thickness may result in poor scratch resistance improvement.

Said curing step c) can optionally comprise a pre-curing step so as to increase the adhesion of the coating to the substrate and the evaporation rate of the solvent i.e. fixing the sol coating to the substrate. The pre-curing step can be carried out in an oven or in any other suitable means using a temperature range between 75 and 150° C., preferably 95-105° C. for a suitable period of time, such as 30 minutes to 2 hours, preferably for 45 to 60 minutes.

The main aim of this step is to allow the coating to transition from a liquid state to a xerogel state, when it will no more move onto the surface to allow transportation and handling. The appearance of the coating will be transparent as in the liquid stage.

To further force and improve reaction rates to generate metal nitrides, said curing step c) can also optionally comprises a nitridation step at high temperatures. The nitridation step can be carried out at temperatures between 700 and 900° C., preferably at 780-850° C., in an oven with a full gaseous nitrogen or gaseous ammonia atmosphere for a suitable period of time. The duration of the treatment may vary between 10 minutes to 3 hours, preferably for 1 to 2 hours, and preferably the heating ramp is 5° C./min to 50° C./min, more preferably 10 to 20° C./min. Gaseous nitrogen atmosphere is preferred because gaseous ammonia atmosphere may lead to lower reaction yield in the coating sol-gel route. The result of this optional step will be an increased yield of reaction for conversion of metal precursors present in the liquid and gel state to metal nitrides and/or metal oxynitride complexes once the coating completes the curing and the sol-gel reaction kinetic is lowered to zero.

Another object of the invention is a coated substrate obtainable according to any one of the embodiments of the method herein disclosed.

The present invention also refers to a coated substrate having an outer and/or an inner surface, wherein part or whole of said outer and/or inner surface is coated with the sol according to any one of the embodiments herein disclosed.

The substrate can be preferably selected among the group consisting of glass ceramic, such as lithium-alumina-silicon (LAS) glass ceramic, glass, sapphire glass, borosilicate glass, aluminosilicate glass, soda-lime glass, synthetic quartz glass, a lithium aluminosilicate glass, or mixture hereof and is preferably glass ceramic or LAS glass ceramic.

Substrates of the glass ceramic type can be both mass colored glass ceramic plates and transparent ones in the visible range.

The coated substrate according to the present invention has improved scratch-resistance properties which can be evaluated with any of the methods known in the art. For instance, scratch resistance can be measured by the pencil hardness test using an Erichsen Hardness pencil tester.

In general, uncoated substrates resist up to 3-5 N, while for higher pressure levels the scratch starts to be clearly visible on the surface even at the naked eye of any untrained individual. Coated substrates according to the present invention, instead, have improved performance, resisting up to 10 N minimum, preferably in the 13-16 N range (maximum in this type of measurement is 20 N). Scratch resistance improvement given by the presence of the sol for use as a coating of the present invention is maintained also after ageing at 800° C. for 3 hours, allowing to conclude that these surprisingly performances are maintained also in applications for induction cooktops (working temperature range up to 400° C.) and radiant cooktops (temperature range up to 800° C.).

Therefore, the present invention also relates to the coated substrate, in particular the coated glass ceramic substrate, with a hardness of 10-16 N as measured by the Erichsen hardness pencil tester. The tool used in this test is composed of a steel pen, with an internal spring that can be tuned to apply the desired load on the pen tip, from 0 to 20 N. Erichsen pen tester has been used by applying a load perpendicular to the surface and moving the pen onto the surface for a length of at least 10 mm. The final result is evaluated by checking which is the higher load when the surface is still intact, with non-scratch visible by naked eye.

Hydrophobicity and surface energy of the coated substrate according to any one of the embodiments herein disclosed, are also different from those of uncoated substrate. For instance, glass ceramic has a water contact angle of about 20-30°, while coated glass ceramic substrates or products are closer to hydrophobicity with 40-90°, more preferably 46-78°, not really hydrophobic (because <90°). In general, coated substrates or products subjected to nitridation treatment steps showed higher water contact angle in the 70-90° range when deposited onto transparent glass ceramic, and in the range of 40-70° if deposited onto black glass ceramic. When products are only cured with heat treatment and without nitridation treatment, water contact angles are slightly lower, in the 50-70° range when deposited onto transparent glass ceramic, and in the range of 30-50° if deposited onto black glass ceramic. Coated substrates or products subjected to nitridation treatment showed anyway a decrease in water contact angle after ageing at 800° C. for 3 hours, coming back to the same values of products treated only with heat curing.

These differences are mainly due to the influence of the following factors: substrate surface roughness, and coating thickness: different layer thicknesses are indeed impacting onto the final surface roughness and properties, such as hydrophobicity and surface energy. Ranges in water contact angles are wide because of measurements done on sprayed applied coatings and dip coated ones, which result in totally different surface roughness.

Therefore, the invention also refers to a coated substrate, preferably a glass ceramic coated substrate, having a water static contact angle of 40 to 90°. Measurements are performed by depositing distilled water drops of 5 µL and are acquired through goniometer instrumental set-up using an image elaboration software (Drop Shape Analysis). Measurements are repeated in duplicate, three time each sample.

The coated substrate of the invention has been further characterized, mainly by X-ray diffraction, Glow Discharge Optical Emission Spectroscopy (GDOES) and X-ray Photon Spectroscopy.

Figure 2:
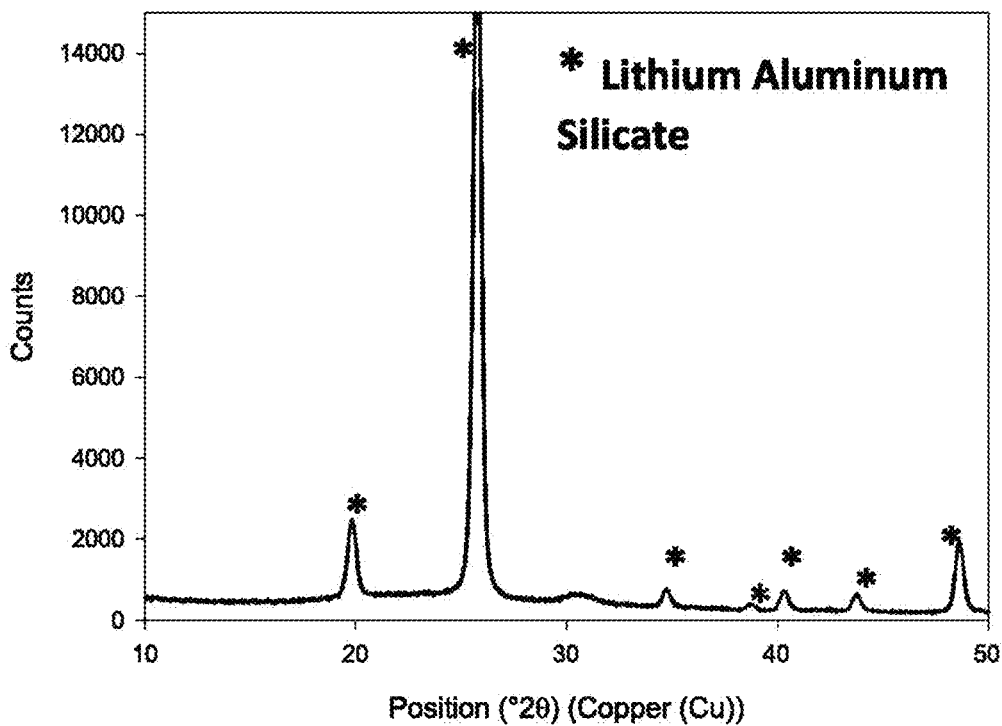
FIG. 2 is a graph showing the X-ray diffraction (XRD) spectrum of a coated substrate by sol with R=1.

Therefore, the invention also refers to the coated substrate according to any one of the embodiments herein disclosed, having an X-ray diffraction (XRD) spectrum comprising the following peaks: 20°, 26°, 34° 38°, 41°, 44, 48° (° 2θ±0.1° using Cu-Kα1 radiation), preferably an XRD spectrum as depicted in FIG. 2.

Figure 3:
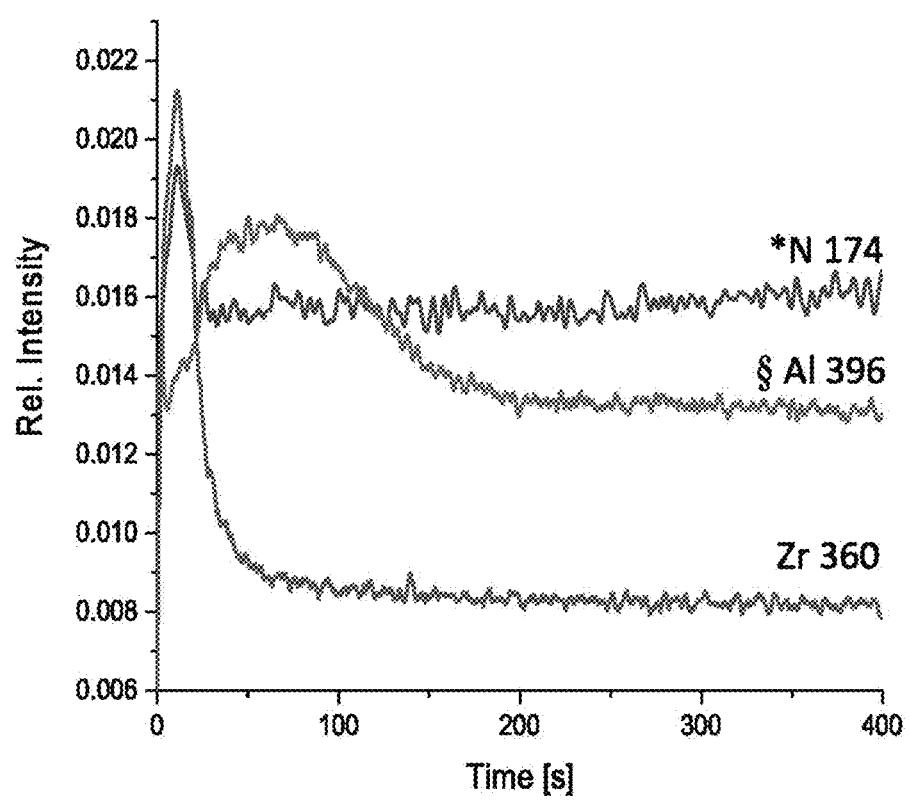
FIG. 3 is a graph showing the Glow-discharge Optical Emission Spectrum (GDOES) of a substrate coated by sol with R=1.
Figure 4:
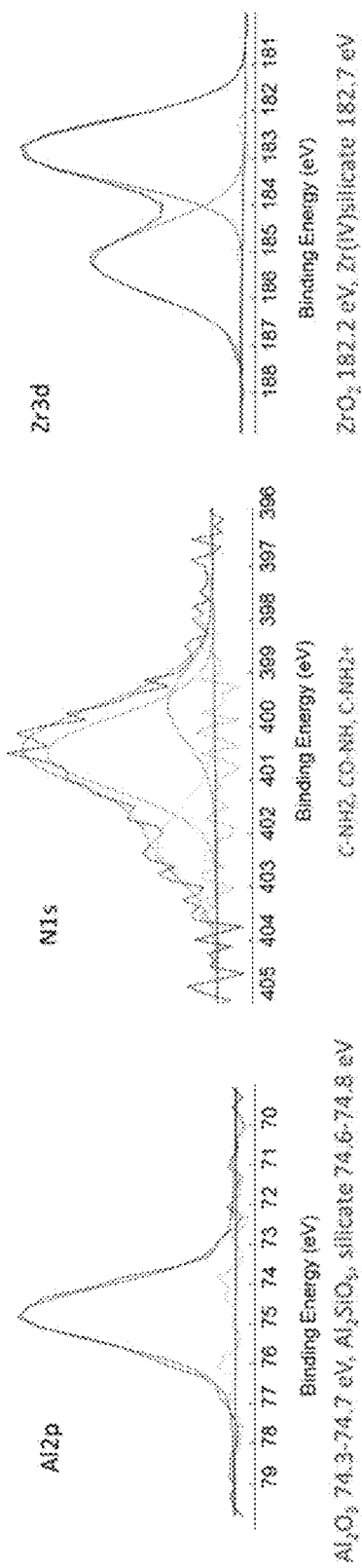
FIG. 4 is a graph showing the X-ray photoelectron spectroscopy (XPS) values and atomic percentage of a coated substrate with R=1.

The coated substrate according to any one of the embodiments herein disclosed, also has a GDOES spectrum preferably as depicted in FIG. 3. Similar measurements can be obtained with XPS (X-ray Photon Spectroscopy) on coated glass samples, in high power mode by a scanning microprobe PHI 5000VersaProbea II (Physical Electronic) with monochromatized AlKα X-ray radiation source. Survey scans and high-resolution spectra are acquired in Fixed Analyzer Transmission (FAT) mode, with pass energy of 117.4 eV and 29.35 eV respectively. The base pressure during analysis is 10-9 mbar. The MultiPak software (v.9.9.0) is exploited for data analysis. Normalized peak area is used to calculate atomic percentages, considering empirically derived sensitivity factors of the MultiPak library, giving ranges for each chemical element presence as shown in FIG. 4 and reported in Table 1 below.

TABLE 1

XPS atomic percentages of Al, N and Zr in analyzed sample, wherein Al2p, N1s, Zr3d indicate, respectively, the primary XPS region of Aluminum, Nitrogen and Zirconium.
Atomic percentage (%)

| | |
|---|---|
| Al2p | 1.7 |
| N1s | 1.9 |
| Zr3d | 1.1 |

Therefore, the invention also refers to the coated substrate according to any one of the embodiments herein disclosed, having an X-ray photoelectron spectroscopy (XPS) spectrum comprising the following peaks: at 74.7 eV for Al2p, at 182.2 eV and 182.7 eV for Zr3d, at 399.6 eV, 400.5 eV and 402.2 eV for N1s, preferably an XPS spectrum as depicted in FIG. 4.

The sol and/or the substrate coated with the sol of the present invention can be used in a variety of fields and applications such as cooking tops, cookwares, glass ceramic covers for fireplaces and stoves, oven cavity surfaces.

Therefore, other objects of the present invention are a cookware or cooktop item intended for cooking food, wherein the cookware or cooktop item comprises a cooking surface in turn comprising the sol or the coated substrate according to any one of the embodiments herein disclosed or a household appliance intended for cooking food, comprising a cooking surface and electrically- or gas-operated means for heating said cooking surface, wherein said cooking surface comprises the sol or the coating substrate according to any one of the embodiments herein disclosed.

Examples of cookware or cooktop items are pans, pots, bowls, dishes, pieces of cutlery, oven trays, cooktops, stovetops, cooking hobs, backing sheets, hotplates, grills, burners, countertops, etc.

Examples of household appliances are coffee makers, blenders, mixers, toaster, microwaves, crock pots, pressure cookers, stoves, lamps, light bulbs, clothes irons, ovens, kitchen hoods, kettles, water cookers, dishwashers, refrigerators etc.

Notably, said cookware or cooktop items may be in the form of flat sheets or plates and/or may have a non-flat surface, for example, a wok (semi-spherical) shape can be integrated therein by shaping the substrate (e.g. glass ceramic) during the production process. Also, the surface of the cookware/cooktop item can present holes, slots, engravings and/or incisions in order to advance the functions of the cookware/cooktop item, such as inserting knobs, or creating guides for touch functions (for example sliding, etc.) where consumers are moving their fingers recognizing the area through the presence of an engraving.

Therefore, besides the advantages already stated above, the sol for coating of the present invention has proved to withstand possible subsequent production/processing steps while maintaining its chemical-physical properties.

Other advantages of the coating of the present invention will be evident to the skilled in the art on the basis of the previous description and the examples below.

EXAMPLES

The examples below are for illustration purposes only and are not intended to limit the scope of the invention. Variations and modifications of any of the embodiments described herein, which are obvious to a skilled in the art, are encompassed in the scope of the appended claims. The skilled in the art will also understand that the coatings in form of sol described here are just some of the possible embodiments of the coating of the invention and that the number of layers deposited onto a substrate, the thickness of the overall coating onto the substrate or the weight percentage thereof with respect to the total weight of the substrate can be adjusted according to the intended use and/or to impart the desired chemical-physical characteristics.

Example 1

Sol with R=2 has been obtained after solubilizing 0.1 mol of metal precursors (aluminum chloride and zirconium chloride) and 0.2 mol of nitrogen carrier (guanidine) in ethanol under nitrogen flux for 15 hours at room temperature of 26° C. The sol is transparent, with a shelf life of 10 months. Substrates of transparent glass ceramic (7×3 cm) have been coated by the sol using dipper (one dipping with a speed immersion of 150 mm*min$^{-1}$). After immersion, substrate have been heated in the oven for 1 hour at 850° C. Coating results transparent, with no rainbow effect. Scratch test performed by the Erichsen hardness pencil tester reveals a hardness of 11 N.

Example 2

Sol with R=5 has been obtained after solubilizing 0.1 mol of metal precursors (aluminum sec-butoxide and zirconium chloride) and 0.5 of nitrogen carrier (urea) in isopropanol under magnetic stirring at 600 rpm for 20 minutes. The sol is transparent, with a shelf life of 2 weeks. Substrates of black glass ceramic (7×3 cm) have been coated by the sol using a dipper (one dipping with a speed immersion of 150 mm*min$^{-1}$). After immersion substrates have been heated in the oven for 2 hours at 800° C. Coating results with opaque finish. Scratch test performed by Pencil Hardness following ASTMS D 3363, reveals a value >9H.

Example 3

Sol with R=2 has been obtained after solubilizing 0.1 mol of metal precursors (aluminum chloride and zirconium chloride) and 0.2 mol nitrogen carrier (urea) in ethanol. The sol is transparent, with a shelf life of six months. Substrates of black glass ceramic (23×27 cm$^2$) have been coated by sol using screen printing method. Subsequently substrates have been heated in the oven at 800° C. for 2 hours. Coating results to be homogeneous with opaque finish Scratch test performed by the Erichsen hardness pencil tester reveals a hardness of 10 N. Cleanability test has been performed, putting 5 grams of ketchup on the coated glass ceramic, and heating it up at 350° C. for 15 minutes, letting consequently cooling down before cleaning step. A wet soft sponge has been used, applying a pressure of 100 g/cm$^2$, to remove the cooked food on the coated glass ceramic, revealing the need of 600 strokes (one stroke considered as back and forth movement) to clean at least 95% of the surface.

Example 4

Sol with R=2 has been obtained after solubilizing 0.1 mol of metal precursors (aluminum and zirconium chloride) and 0.2 mol of nitrogen carrier (urea) in ethanol under continuous gaseous nitrogen flux for 12 hours. The sol is transparent, with a shelf life of six months. Substrate of black glass ceramic (51×58 cm$^2$, for the purpose of simulate a cooktop) has been coated by sol using spray coating and subsequently heated in the oven at 800° C. for 3 hours. Coating results to be transparent and homogeneous with no rainbow effect, purple and pink haloes or blue and green haloes. Film may appear slightly with metallic finishing, but will be resistant to scratch with pot and pans. No significant change has been detected by sliding a pot made of stainless steel with 21 cm base diameter, applying a pressure of 0.7 Pa.

Except where otherwise expressly indicated, all numerical quantities in this disclosure are to be understood as modified by the word "about". The term "substantially," "generally," or "about" may be used herein and may modify a value or relative characteristic disclosed or claimed. In such instances, "substantially," "generally," or "about" may signify that the value or relative characteristic it modifies is within ±0%, 0.1%, 0.5%, 1%, 2%, 3%, 4%, 5% or 10% of the value or relative characteristic (e.g., with respect to transparency as measured by opacity). Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sol coating for a cooking appliance comprising:
   one or more metal precursors solubilized in a solvent with an overall concentration of 0.05 to 0.5 M, the one or more metal precursors comprises at least aluminum chloride; and
   a nitrogen carrier,
   wherein the one or more metal precursors and nitrogen carrier are taken under a continuous nitrogen flux at room temperature and wherein a molar ratio between the nitrogen carrier and the one or more metal precursors is between 0.5 to 5, and upon deposition of a layer of the sol coating having a thickness of 1-8 micrometers via screen-printing, or 100 to 200 nm via dip-coating or spray-coating, onto a cooking surface and curing, the sol coating has a scratch resistance of 10 to 16 N as based on pencil hardness.

2. The sol coating of claim 1, further comprising (3-glycidyloxypropyl) trimethoxysilane provided as a 0.05 M solution in ethanol.

3. The sol coating of claim 1, wherein the one or more metal precursors further includes zirconium chloride.

4. The sol coating of claim 1, wherein the one or more metal precursors is solubilized in the solvent with an overall concentration of 0.1 M.

5. The sol coating of claim 1, wherein, upon curing, the sol coating has a water static contact angle of 40 to 90 degrees.

* * * * *